US012496600B2

(12) United States Patent
Broghammer et al.

(10) Patent No.: US 12,496,600 B2
(45) Date of Patent: Dec. 16, 2025

(54) HIGH-PRESSURE CLEANING DEVICE

(71) Applicant: Andreas Stihl AG & Co. KG, Waiblingen (DE)

(72) Inventors: Fabian Emanuel Broghammer, Lorch-Waldhausen (DE); Christopher Tost, Auenwald (DE); Richard Fresow, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 802 days.

(21) Appl. No.: 17/371,339

(22) Filed: Jul. 9, 2021

(65) Prior Publication Data

US 2022/0016654 A1 Jan. 20, 2022

(30) Foreign Application Priority Data

Jul. 14, 2020 (EP) .................................... 20185778

(51) Int. Cl.
*B05B 9/04* (2006.01)
*B08B 3/02* (2006.01)

(52) U.S. Cl.
CPC ............ *B05B 9/0423* (2013.01); *B08B 3/026* (2013.01); *B08B 2203/027* (2013.01)

(58) Field of Classification Search
CPC ....... B05B 1/16; B05B 1/3073; B05B 1/3006; B05B 1/323; B05B 12/087; B05B 7/1254; B05B 9/0423; B08B 2203/027
USPC ................. 239/390–396, 570; 137/497, 500; 251/206
See application file for complete search history.

(56) References Cited

U.S. PATENT DOCUMENTS

| | | | | |
|---|---|---|---|---|
| 4,613,074 | A * | 9/1986 | Schulze | B08B 3/026 137/12 |
| 5,558,503 | A * | 9/1996 | Weller | B08B 3/026 417/189 |
| 5,785,067 | A | 7/1998 | Kosofsky | |
| 5,794,854 | A | 8/1998 | Yie | |
| 6,659,187 | B1 * | 12/2003 | Crabtree | B05B 7/0018 169/44 |
| 7,159,797 | B1 | 1/2007 | Lammers | |
| 8,915,480 | B2 * | 12/2014 | Jakobsen | F16K 31/122 251/30.02 |

(Continued)

FOREIGN PATENT DOCUMENTS

| | | |
|---|---|---|
| CH | 696692 | 9/2007 |
| CN | 101961696 | 2/2011 |

(Continued)

*Primary Examiner* — Joseph A Greenlund
(74) *Attorney, Agent, or Firm* — Gudrun E. Huckett

(57) ABSTRACT

A high-pressure cleaning device has a conveying pump and a conveying conduit with a spray opening. The conveying conduit conveys cleaning liquid, conveyed by the conveying pump, in a conveying direction from the conveying pump to the spray opening of the conveying conduit. A switch element is provided that has at least a first switched state and a second switched state. An actuator is provided that adjusts the switch element between the first switched state and the second switched state. The high-pressure cleaning device is provided such that the actuator adjusts the switch element between the first switched state and the second switched state by an adjusting force effected by the cleaning liquid on the actuator.

19 Claims, 4 Drawing Sheets

(56) References Cited

U.S. PATENT DOCUMENTS

| | | | | |
|---|---|---|---|---|
| 9,175,459 | B2 * | 11/2015 | Zhang | E03C 1/02 |
| 9,895,702 | B2 * | 2/2018 | Lei | B05B 1/169 |
| 10,247,313 | B2 | 4/2019 | Chien | |
| 10,273,167 | B1 * | 4/2019 | Sherry | C02F 1/043 |
| 11,433,858 | B2 * | 9/2022 | Fiebrandt | B60S 1/481 |
| 11,957,287 | B2 * | 4/2024 | Lin | B08B 3/02 |
| 2005/0274826 | A1 | 12/2005 | Chen | |
| 2007/0095944 | A1 | 5/2007 | Chih | |
| 2007/0267063 | A1 * | 11/2007 | Davis | B08B 3/026 137/115.11 |
| 2010/0301130 | A1 | 12/2010 | Townsend | |
| 2013/0320108 | A1 | 12/2013 | Sesser et al. | |
| 2014/0084083 | A1 | 3/2014 | Jenkins et al. | |
| 2014/0138565 | A1 * | 5/2014 | Mcloughlin, Jr. | B05B 1/323 239/589 |
| 2014/0263755 | A1 | 9/2014 | Lariviere | |
| 2016/0136659 | A1 | 5/2016 | Erickson et al. | |
| 2016/0199856 | A1 | 7/2016 | Raghunandan et al. | |
| 2016/0325291 | A1 | 11/2016 | Zhou et al. | |
| 2017/0072413 | A1 | 3/2017 | Weidmann | |
| 2017/0173602 | A1 | 6/2017 | Erickson et al. | |
| 2017/0312766 | A1 | 11/2017 | Erickson et al. | |
| 2018/0049422 | A1 | 2/2018 | Wells | |
| 2018/0058685 | A1 * | 3/2018 | Qiu | B05B 1/304 |
| 2018/0281001 | A1 * | 10/2018 | Masters | B08B 3/026 |
| 2019/0085989 | A1 * | 3/2019 | Klein | F16K 11/074 |
| 2019/0224696 | A1 * | 7/2019 | Melle | B05B 15/654 |
| 2020/0023387 | A1 * | 1/2020 | Nikles | E03C 1/0409 |
| 2020/0282416 | A1 * | 9/2020 | Fiebrandt | B05B 1/3006 |
| 2021/0282315 | A1 * | 9/2021 | Charcosset | B05B 12/088 |
| 2021/0387215 | A1 * | 12/2021 | Fenley, Jr. | B05B 7/066 |
| 2022/0016654 | A1 * | 1/2022 | Broghammer | B05B 15/72 |
| 2022/0234064 | A1 * | 7/2022 | Bremer | B05B 12/08 |
| 2022/0401772 | A1 * | 12/2022 | Staszak | B05B 15/652 |

FOREIGN PATENT DOCUMENTS

| | | |
|---|---|---|
| CN | 103212500 | 7/2013 |
| CN | 105813763 | 7/2016 |
| CN | 107073503 | 8/2017 |
| CN | 109070107 | 12/2018 |
| CN | 210522865 | 5/2020 |
| DE | 1 005 783 | 4/1957 |
| DE | 10 2010 006 861 | 8/2011 |
| DE | 20 2018 103 613 | 7/2018 |
| DE | 10 2017 206 503 | 10/2018 |
| DE | 102018103426 | 8/2019 |
| EP | 2 792 416 | 10/2014 |
| EP | B 135 383 | 3/2017 |
| WO | 2012/095238 | 7/2012 |
| WO | 2017/218113 | 12/2017 |
| WO | 2019/206511 | 10/2019 |

* cited by examiner

HIGH-PRESSURE CLEANING DEVICE

BACKGROUND OF THE INVENTION

The invention relates to a high-pressure cleaning device comprising a conveying pump, a conveying conduit through which by means of the conveying pump cleaning liquid can be conveyed in a conveying direction from the conveying pump to a spray opening of the conveying conduit, a switch element comprising at least a first switched state and a second switched state, and an actuator for adjusting the switch element between the first and the second switched states.

WO 2012/095238 discloses a high-pressure cleaning device with a manually rotatable switch element. By rotation of the switch element, various nozzles can be selected for operation of the high-pressure cleaning device. For this purpose, the lance of the high-pressure cleaning device must be held with both hands and the switch element must be rotated relative to a base member of the lance.

It is an object of the invention to further develop a high-pressure cleaning device of the aforementioned kind such that a simple and comfortable adjustment of the switch element is possible.

SUMMARY OF THE INVENTION

In accordance with the invention, this object is solved in that the high-pressure cleaning device is configured such that the actuator, due to a force effected by the cleaning liquid on the actuator, can adjust the switch element between the first switched state and the second switched state.

In this way, the switch element can be comfortably adjusted. A user of the high-pressure cleaning device must not himself exert a force to do this. The switch element can be automatically switched by utilizing the pressure of the cleaning liquid. Since the pressure of the cleaning liquid or the cleaning liquid itself is utilized for adjusting the switch element, a simple configuration of the high-pressure cleaning device results. No additional motors or pressure circuits are required.

Advantageously, the high-pressure cleaning device comprises at least a first work element and a second work element. Expediently, in the first switched state of the switch element, the first work element is switched and connected to the conveying conduit; in the second switched state of the switch element, the second work element is switched and connected to the conveying conduit. By adjustment of the switch element, various work elements can thus be switched and connected to the conveying conduit in a simple manner.

In particular, the first work element and the second work element are nozzles. In this way, a comfortable nozzle exchange can be enabled. Depending on the selection of the individual nozzles, a pressure adjustment or pressure change without change of the volume flow in the conveying conduit is possible in this way. Even in case of a pressure reduction, operation with the full flow rate can be realized.

Expediently, the high-pressure cleaning device comprises a conveyance actuating element with which the passage of cleaning liquid through the conveying conduit in an open position of the conveyance actuating element is permitted and is blocked in a closed position of the conveyance actuating element. The conveyance actuating element is arranged between the conveying pump and the spray opening in the conveying conduit.

In an advantageous embodiment of the invention, the high-pressure cleaning device comprises a branch conduit that connects the conveying conduit at a branch location of the conveying conduit to the actuator. In this way, cleaning liquid can be conveyed to the actuator in a simple manner.

Expediently, between the branch location and the actuator a switch actuating element is provided with which the passage of cleaning liquid through the branch conduit in a passage position of the switch actuating element is permitted and in a blocking position of the switch actuating element is prevented. As a function of the position of the switch actuating element, the actuator can be loaded, or not loaded, with pressure of the cleaning liquid. The switch actuating element divides the branch conduit into a holding section, extending from the branch location to the switch actuating element, and into a pressure section, extending from the switch actuating element to the actuator.

In particular, the high-pressure cleaning device is configured such that, in operation of the high-pressure cleaning device, a holding pressure is present in the holding section of the branch conduit when the switch actuating element is in the blocking position and the conveyance actuating element is in the closed position. Expediently, the high-pressure cleaning device is configured such that the holding pressure can be increased by the conveying pump when the switch actuating element is in the blocking position and the conveyance actuating element is in the closed position. In particular, the holding pressure can be so high that it is at least high enough in order to exert on the actuator the adjusting force for adjusting the switch element. In this way, the pressure of the cleaning liquid can be utilized in a simple manner for adjustment of the switch element.

Advantageously, the branch location of the conveying conduit is arranged between the conveying pump and the conveyance actuating element in the conveying conduit. In this way, the conveyance actuating element can be closed and then, by means of the conveying pump, a sufficiently high holding pressure can be built up. Expediently, the conveyance actuating element is arranged between the conveying pump and the switch element arranged in the conveying conduit. In this way, the high-pressure cleaning device can be configured such that the switch element in the closed position of the conveyance actuating element is no longer loaded with pressure by the conveying pump and the cleaning liquid. An adjustment of the switch element between the first switched state and the second switched state is then possible in a simple manner.

In an advantageous further embodiment of the invention, between the branch location of the conveying conduit and the conveying pump a conveyance check valve is arranged in the conveying conduit. The conveyance check valve prevents a flow of cleaning liquid opposite to the conveying direction. In this way, a sufficiently large holding pressure can be built up in the branch conduit.

In an advantageous further embodiment of the invention, the high-pressure cleaning device is configured such that in operation of the high-pressure cleaning device, when in the holding section of the branch conduit a sufficient holding pressure is present, the cleaning liquid advances from the holding section into the pressure section of the branch conduit upon adjustment of the switch actuating element from the blocking position into the passage position and exerts on the actuator the adjusting force for adjustment of the switch element between the first switched state and the second switched state. In this manner, a different nozzle can be switched and connected to the conveying conduit, for example.

In an advantageous embodiment of the invention, the high-pressure cleaning device comprises a drainage return channel. Expediently, the drainage return channel connects the pressure section of the branch conduit with an element section of the conveying conduit extending from the conveyance actuating element to the spray opening. In particular, the high-pressure cleaning device is configured such that the drainage return channel is interrupted in the passage position of the switch actuating element; in the blocking position of the switch actuating element, a flow of cleaning liquid is possible only in the direction from the pressure section to the element section. In this way, a pressure reduction in the pressure section of the branch conduit is possible. In this context, cleaning liquid flows from the pressure section to the element section of the conveying conduit. As a result of this, the pressure acting on the actuator decreases.

Expediently, the high-pressure cleaning device is configured such that a drainage check valve in the blocking position of the switch actuating element is switched and connected to the drainage return channel. In particular, the drainage check valve is a component of the switch actuating element. Advantageously, in the passage position of the switch actuating element, the drainage check valve is removed from the drainage return channel due to the adjustment of the switch actuating element. In this way, the arrangement of the drainage check valve in the drainage return channel is coupled in a simple way to the position of the switch actuating element.

Advantageously, the switch actuating element is in operative connection with a first restoring spring in such a way that it is loaded with a force in the direction toward its blocking position. In this way, it is ensured that the switch actuating element, when not actuated by a user, returns into the blocking position.

In particular, the conveyance actuating element is in operative connection with a second restoring spring in such a way that it is loaded by a force in the direction of its closed position.

Expediently, the actuator comprises a rest position and an adjusted position wherein the actuator must be moved for adjustment of the switch element from the rest position into the adjusted position. In particular, the actuator is in operative connection with a third restoring spring in such a way that it is loaded by a force in the direction toward the rest position.

Advantageously, the actuator is guided in a cylinder of a hydraulic cylinder. In this way, the actuator can be produced in a simple manner.

In an advantageous further embodiment of the invention, the high-pressure cleaning device is configured such that the actuator can adjust the switch element due to a force exerted by the operator of the high-pressure cleaning device on the actuator.

BRIEF DESCRIPTION OF THE DRAWING

An embodiment of the invention will be explained in the following with the aid of the drawing.

DESCRIPTION OF PREFERRED EMBODIMENTS

Figure 1:
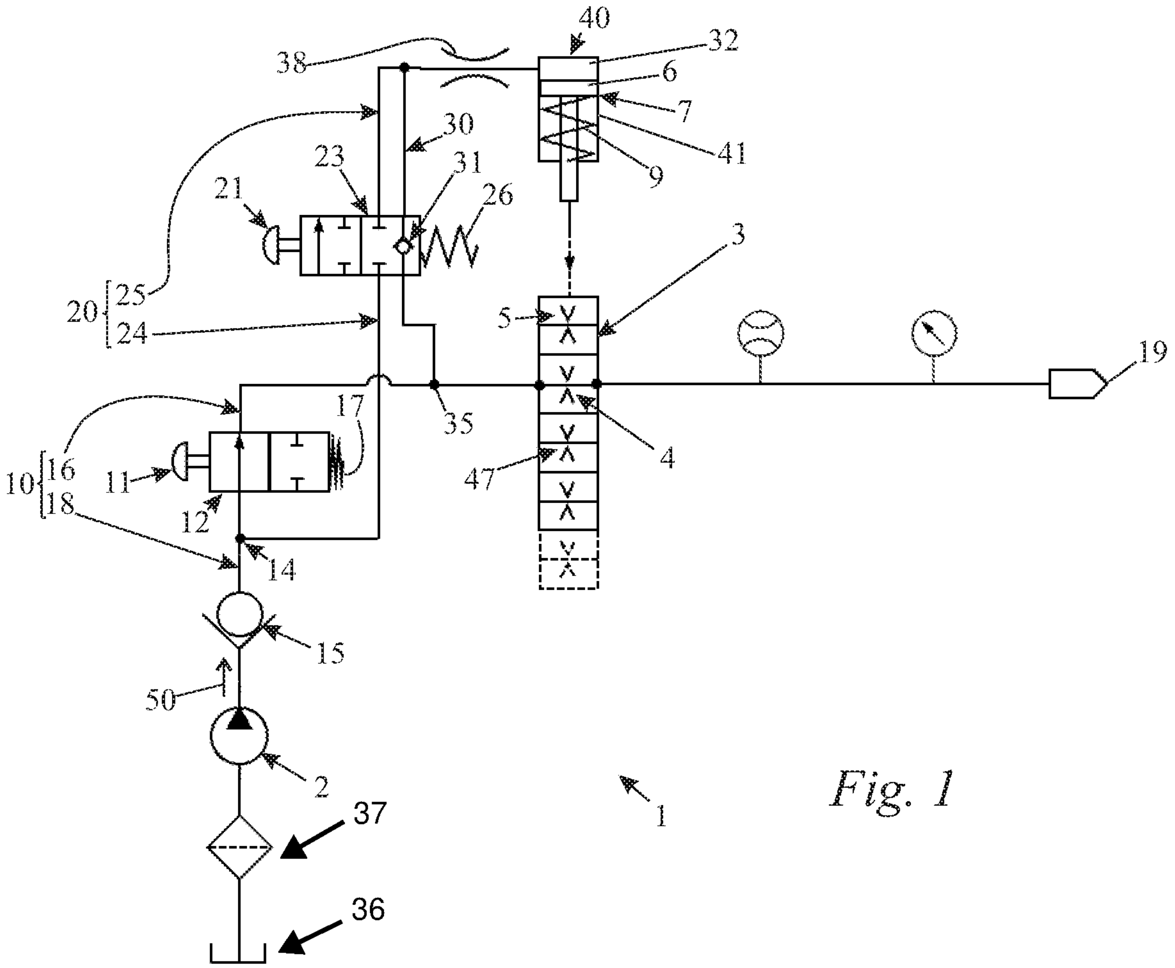
FIG. 1 is a schematic illustration of a diagram of connections of a high-pressure cleaning device.

FIG. 1 shows a schematic illustration of a diagram of connections of a high-pressure cleaning device 1. The high-pressure cleaning device 1 comprises a conveying conduit 10. The conveying conduit 10 connects a conveying pump 2 with a spray opening 19. The conveying pump 2 conveys cleaning liquid from the conveying pump 2 through the conveying conduit 10 to the spray opening 19. The conveying pump 2 conveys cleaning liquid from a liquid container 36 through a filter 37 to the spray opening 19. The spray opening 19 is the end of the conveying conduit 10. The cleaning liquid exits under high pressure from the spray opening 19. The conveying pump 2 conveys cleaning liquid in a conveying direction 50 in the conveying conduit 10.

The high-pressure cleaning device 1 comprises a conveyance actuating element 11. The conveyance actuating element 11 is arranged between the conveying pump 2 and the spray opening 19. By means of the conveyance actuating element 11, passage of cleaning liquid through the conveying conduit 10 can be permitted or prevented. In an open position 12 (FIG. 1) of the conveyance actuating element 11, conveyance of cleaning liquid from the conveying pump 2 to the spray opening 19 is possible. In a closed position 13 (FIG. 4) of the conveyance actuating element 11, conveyance of cleaning liquid from the conveying pump 2 to the spray opening 19 is prevented. The high-pressure cleaning device 1 comprises a second restoring spring 17. The conveyance actuating element 11 is in operative connection with the second restoring spring 17 such that it is loaded by a force in the direction toward its closed position 13. Only when the conveyance actuating element 11 is held in the open position 12, the cleaning liquid can pass through the conveyance actuating element 11. When the conveyance actuating element 11 is not held in the open position 12, it is returned due to the force load by the second restoring spring 17 into its closed position 13. The conveyance actuating element 11 is configured as a switch which can be actuated by hand by a user.

Figure 2:
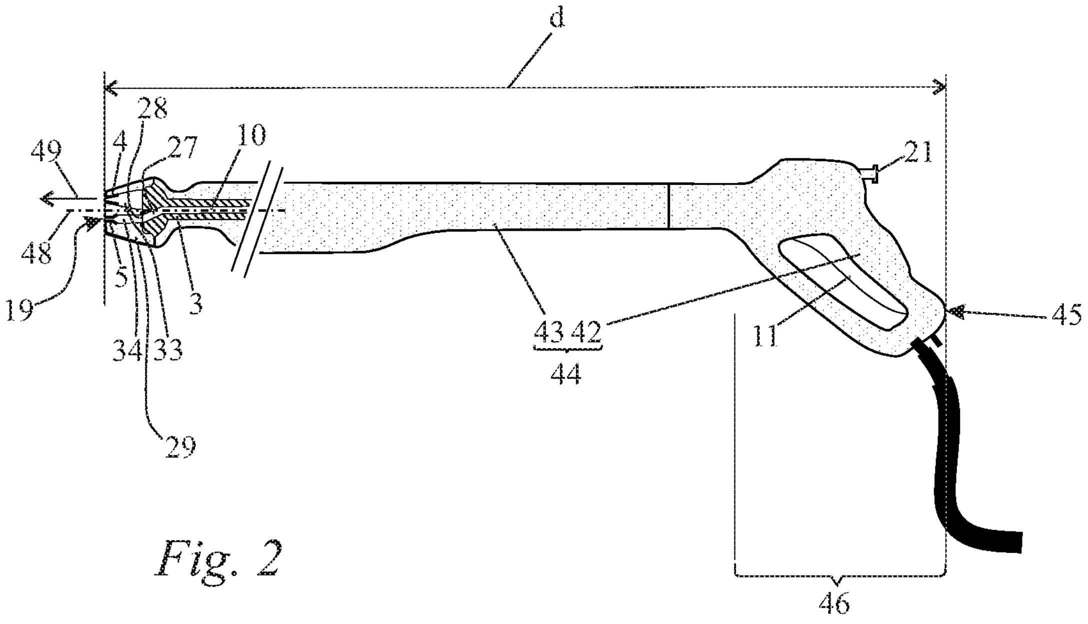
FIG. 2 is a schematic, partially sectioned illustration of a high-pressure gun of the high-pressure cleaning device according to FIG. 1.

As is illustrated in FIG. 2, the high-pressure cleaning device 1 comprises a high-pressure gun 44. The high-pressure gun 44 comprises a grip 42 and a lance 43. The conveyance actuating element 11 is arranged at the grip 42. The lance 43 extends in a longitudinal direction 49. The high-pressure gun 44 comprises in longitudinal direction 49 a longitudinal end 45. The longitudinal end 45 is facing away from the spray opening 19. At one end of the high-pressure gun 44, the spray opening 19 is arranged and at the other end the longitudinal end 45 is arranged. The high-pressure gun 44 comprises a longitudinal section 46. The longitudinal section 46 begins at the longitudinal end 45 and extends in longitudinal direction 49. The high-pressure gun 44 comprises a length d measured in longitudinal direction 49. The longitudinal section 46 extends across one fourth of the length d of the high-pressure gun 44. The conveyance actuating element 11 is arranged in the longitudinal section 46.

As illustrated in FIGS. 1 and 2, the high-pressure cleaning device 1 comprises a switch element 3. The switch element 3 comprises at least a first switched state and a second switched state. In the embodiment, the high-pressure cleaning device 1 comprises a first work element 4 and a second work element 5. In the first switched state, the first work element 4 is switched and connected to the conveying conduit 10 (FIGS. 1, 3 and 4); in the second switched state, the second work element 5 is switched and connected to the conveying conduit 10 (FIGS. 5 through 8). In the embodiment, in the first switched state only the first work element 4 is switched and connected to the conveying conduit 10; in the second switched state, only the second work element 5 is switched and connected to the conveying conduit 10. The first work element 4 and the second work element 5 are nozzles. However, it can also be provided that the switch element is a simple switch and no work elements are provided that are switched and connected to the conveying conduit.

In the embodiment according to FIGS. 1 through 8, a plurality of switched states are provided. In a third switched state, a third nozzle 47 is switched and connected to the conveying conduit 10. In the embodiment according to FIGS. 1 through 8, the high-pressure cleaning device 1 comprises at least three work elements 4, 5, and 47 embodied as nozzles.

As illustrated in FIG. 2, the conveying conduit 10 branches in the region between the switch element 3 and the spray opening 19. A first branch 33 opens at the spray opening 19 into the first work element 4 embodied as a nozzle. A second branch 34 opens at the spray opening 19 into the second work element 5 embodied as a nozzle. The number of branches corresponds to the number of switched states of the switch element 3. The high-pressure cleaning device 1 comprises a third nozzle 47 (FIG. 1). The branches 33 and 34 are arranged in a base member 29 of the lance 43 of the high-pressure cleaning device 1. The branches 33 and 34 are channels in the base m ember 29.

The switch element 3 is rotatably supported about an axis of rotation 48 (FIG. 2). The axis of rotation 48 extends in the longitudinal direction 49. The switch element 3 comprises a switch channel 27. The switch channel 27 comprises a mouth 28. The mouth 28 is facing the spray opening 19. The mouth 28 is arranged eccentrically in relation to the axis of rotation 48. The mouth 28 is arranged at a distance from the axis of rotation 48. In a first switched state of the switch element 3, the switch channel 29 opens with the mouth 28 into the first branch 33 of the branch conduit 20. In the second switched state of the switch element 3 illustrated in FIG. 2, the switch channel 27 opens with its mouth 28 into the second branch 34 of the branch conduit 20. In the first switch state and in the second switch state, the switch element 3 is pushed in the direction toward the spray opening 19 against the base member 29. For this purpose, a spring (not illustrated) is provided. Between the switch element 3 and the base member 29, a sealing ring, not illustrated, is arranged. Since the switch element 3 is pressed against the base member 29, the connection between the switch channel 27 and the branches 33, 34 is sufficiently sealed for passing the cleaning liquid therethrough.

When switching the switch element 3 from the first switched state into the second switched state, the switch element 3 is rotated about the axis of rotation 48 illustrated in FIG. 2. When switching from the first switched state into the second switched state, the switch element 3 is first moved, prior to a rotation about the axis of rotation 48, in the direction opposite to the longitudinal direction 49 away from the spray opening 19. This is possible because no pressure is exerted by the cleaning liquid on the switch element 3 when the conveyance actuating element 11 is in the closed position 13. The high-pressure cleaning device 1 is configured such that the switch element 3 in the closed position 13 of the conveyance actuating element 11 is movable in the direction away from the spray opening 19 relative to the base member 29. In this way, wear of the sealing ring and of the high-pressure cleaning device 1 when switching the switch element can be minimized. Upon switching by a rotational movement of the switch element 3 in relation to the base member 29, the sealing ring is thus not as strongly, or not at all, pressed against the base member 29. Therefore, no friction forces, or hardly any friction forces, are acting between the sealing ring and the base member 29 during switching. The high-pressure cleaning device is configured such that the switch element 3, after adjustment of the switch element 3 between the first switched state and the second switched state, is pressed again in the direction toward the spray opening 19 against the base member 29.

The first branch 33 extends to the first work element 4. The second branch 34 extends to the second work element 5. By rotation of the switch element 3 about the axis of rotation 48, various work elements 4, 5 can be switched and connected to the conveying conduit 10. The first branch 33 in the first switched state of the switch element 3 is a component of the conveying conduit 10. In the first switched state of the switch element 3, the second branch 34 is not a component of the conveying conduit 10. In the second switched state of the switch element 3, this second branch 34 is a component of the conveying conduit 10 and the first branch 33 is not a component of the conveying conduit 10. The switch element 3 in the embodiment is also referred to as a nozzle switch. The switch element 3 is arranged in the conveying conduit 10.

It can also be provided that the work elements are components of the switch element. In this case, the work elements are moved together with the switch element. Then, the work elements can be moved together with the switch element and thus switched and connected to the conveying conduit.

In the embodiment, the high-pressure cleaning device 1 comprises an actuator 6. The actuator 6 serves for adjusting the switch element 3 between the first switched state and the second switched state. The high-pressure cleaning device 1 is designed such that the actuator 6, due to an adjusting force effected by the cleaning liquid on the actuator 6, can adjust the switch element 3 between the first switched state and the second switched state. In the embodiment according to FIGS. 1 through 8, the pressure of the cleaning liquid effects an adjustment of the switch element 3 between the first switched state and the second switched state. For adjusting the switch element 3, the actuator 6 is acting on the switch element 3. In the embodiment, the actuator 6 is guided in a cylinder 41 of a hydraulic cylinder 40. The actuator 6 comprises the piston and the piston rod of the hydraulic cylinder 40. The actuator 6 is a component of the hydraulic cylinder 40. The actuator 6 can move back and forth in the hydraulic cylinder 40 between a rest position 7 (FIG. 1) and an adjusted position 8 (FIG. 5). The actuator 6 is in operative connection with a third restoring spring 9 in such a way that it is loaded by a force in the direction toward the rest position 7. The third restoring spring 9 is arranged between the piston of the actuator 6 and the cylinder 41.

For adjusting the switch element 3, the actuator 6 must be moved from the rest position 7 into the adjusted position 8. The piston of the actuator 6 delimits with a portion of the cylinder 41 of the hydraulic cylinder 40 a pressure chamber 32. The volume of the pressure chamber 32 is minimal in the rest position 7 of the actuator 6. The pressure chamber 32 is connected by a branch conduit 20 to the conveying conduit 10. The conveying conduit 10 comprises a branch location 14. The branch conduit 20 connects the branch location 14 with the actuator 6. The branch conduit 20 connects the pressure chamber 32 in fluid communication with the conveying conduit 10. The actuator 6 is arranged at the end of the branch conduit 20. The branch location 14 is arranged between the conveying pump 2 and the conveyance actuating element 11 in the conveying conduit 10.

A switch actuating element 21 is provided between the branch location 14 and the actuator 6. With the switch actuating element 21, a passage through the branch conduit 20 can be opened or closed. By means of the switch actuating element 21, passage of cleaning liquid through the branch conduit 20 is permitted in the passage position 22 (FIG. 5) of the switch actuating element 21; in a blocking position 23 (FIG. 1, FIG. 3, FIG. 4, FIGS. 6 to 8) of the switch actuating element 21, passage of cleaning liquid is prevented. In the passage position 22 of the switch actuating element 21, the cleaning liquid can pass the passageway at the switch actuating element 21. In the blocking position 23, the cleaning liquid cannot flow through the passageway. The high-pressure cleaning device 1 comprises a first restoring spring 26. The switch actuating element 21 is in operative connection with the first restoring spring 26 in such a way that it is loaded by a force in the direction toward its blocking position 23. When the switch actuating element 21 is not held in the passage position 22, it is returned due to the force of the first restoring spring 26 into its blocking position 23.

The switch actuating element 21 is arranged between the branch location 14 and the actuator 6 in the branch conduit 20. As illustrated in FIG. 2, the switch actuating element 21 is arranged in the longitudinal section 46 of the high-pressure gun 44. When the grip is gripped by a hand of the user, the switch actuating element 21 can be operated with the same hand with which the grip 42 is gripped. The switch actuating element 21 divides the branch conduit 20 into a holding section, extending from the branch location 14 to the switch actuating element 21, and into a pressure section 25 (FIG. 1), extending from the switch actuating element 21 to the actuator 6. The pressure section 25 extends between the switch actuating element 21 and the pressure chamber 32. The holding section 24 extends between the branch location 14 and the switch actuating element 21.

In the branch conduit 20, a throttle element 38 is arranged. The throttle element 38 is arranged in the pressure section 25 of the branch conduit 20. In this way, the flow rate of the cleaning liquid along its path to the actuator 6 can be regulated. In particular, the flow rate can be increased in this way.

The high-pressure cleaning device 1 comprises a drainage return channel 30. The conveying conduit 10 comprises an element section 16 and a pump section 18. The pump section 18 extends between the conveying pump 2 and the conveyance actuating element 11. The element section 16 extends between the conveyance actuating element 11 and the spray opening 19. The drainage return channel 30 connects the pressure section 25 of the branch conduit 20 with the element section 16 of the conveying conduit 10. The drainage return channel 30 opens at a drainage location 35 of the conveying conduit 10 into the conveying conduit 10. The drainage location 35 is arranged between the conveyance actuating element 11 and the switch element 3 in the conveying conduit 10. The high-pressure cleaning device 1 comprises a drainage check valve 31. In the blocking position 23 of the switch actuating element 21, the drainage check valve 31 is arranged in the drainage return channel 30. Then, the drainage check valve 31 enables flow of cleaning liquid from the pressure section 25 of the branch conduit 20 into the element section 16 of the conveying conduit 10. The drainage check valve 31 prevents flow of cleaning liquid in the direction from the drainage location 35 to the pressure section 25 through the drainage return channel 30.

The high-pressure cleaning device 1 comprises a conveyance check valve 15. The conveyance check valve 15 is arranged in the pump section 18 of the conveying conduit 10. The conveyance check valve 15 is arranged between the conveying pump 2 and the conveyance actuating element 11 in the conveying conduit 10. The conveyance check valve 15 is arranged between the branch location 14 and the conveying pump 2. The conveyance check valve 15 prevents a flow of cleaning liquid opposite to the conveying direction 50. The conveyance check valve 15 enables a flow of cleaning liquid in the conveying direction 50.

Figure 3:
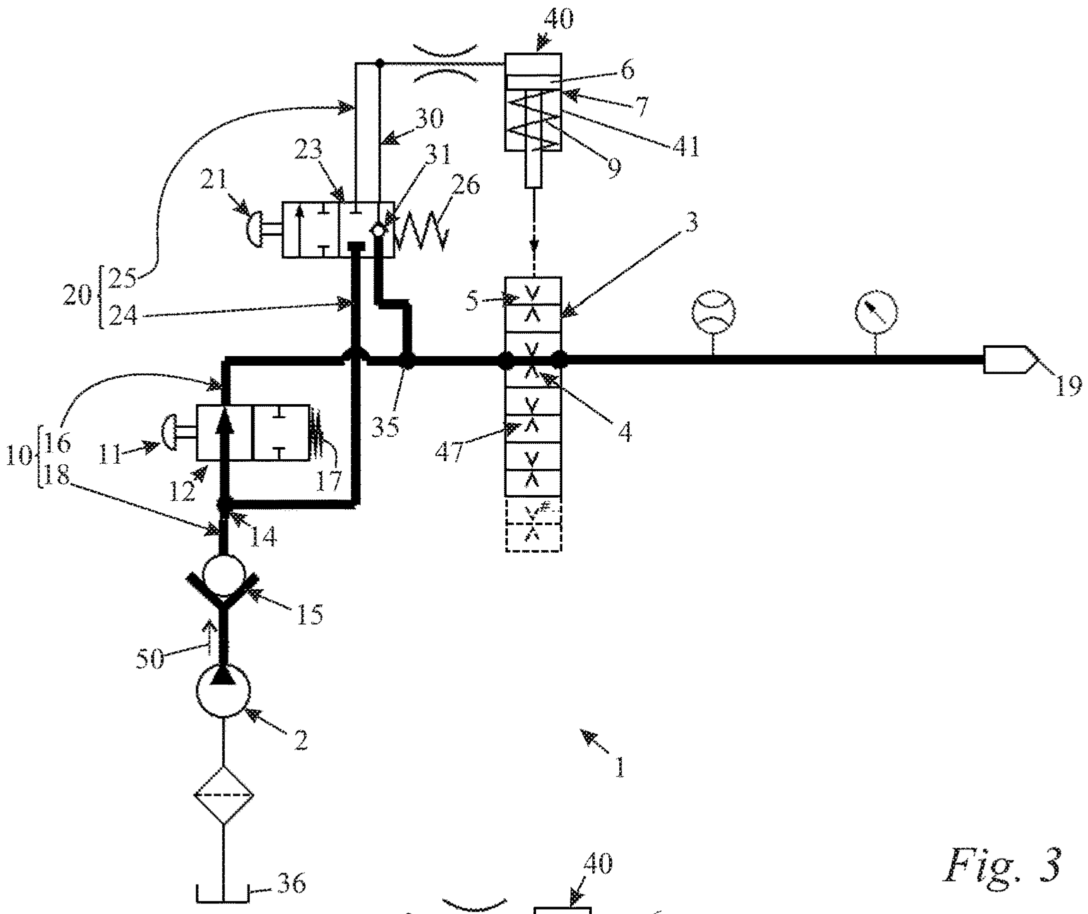
FIG. 3 is a schematic illustration of the diagram of connections of FIG. 1, wherein a conveyance actuating element is in an open position, a switch actuating element in a blocking position, and an actuator in a rest position.

FIGS. 3 to 8 show the high-pressure cleaning device 1 in various operating states. In the schematic diagram of connections, cleaning liquid which is under high pressure is illustrated by thick solid lines. Cleaning liquid that is at low pressure is illustrated by dotted lines. In FIG. 3, the conveyance actuating element 11 is in the open position 12. The switch actuating element 21 is in the blocking position 23. The conveying pump 2 conveys cleaning liquid from the liquid container 36 through the conveying conduit 10 to the spray opening 19. Cleaning liquid is sprayed from the spray opening 19 at high pressure. The cleaning liquid in the conveying conduit 10 is under high pressure. The cleaning liquid in the holding section 24 of the branch conduit 20 is under high pressure. The cleaning liquid in the section of the drainage return channel 30 between the switch actuating element 21 and the drainage location 35 is under high pressure. In the pressure section 25 of the branch conduit 20, there is no or only little cleaning liquid. This cleaning liquid is not pressurized or only minimally pressurized. The switch element 3 is in the first switched state. In the first switched state of the switch element 3, the switch element 3 guides the cleaning liquid to the first work element 4. The first work element 4 is switched and connected to the conveying conduit 10. The actuator 6 is in the rest position 7.

Figure 4:
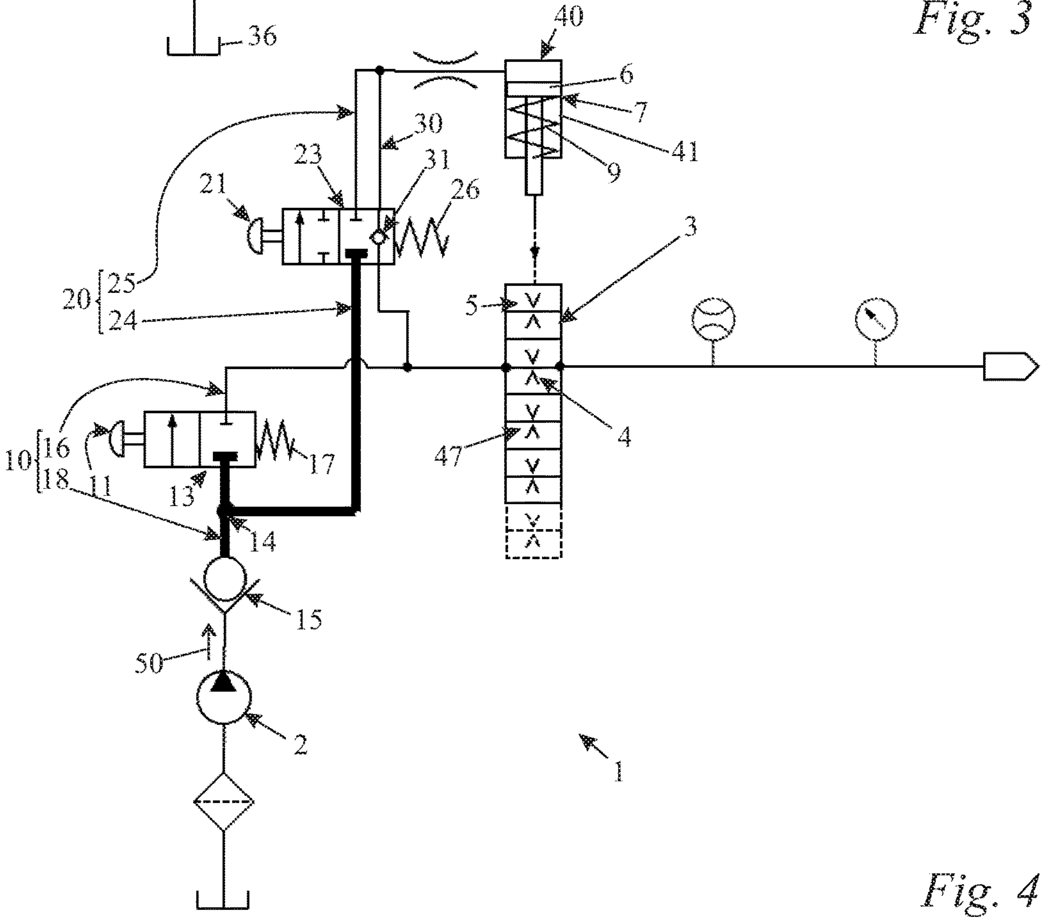
FIG. 4 is a schematic illustration of the diagram of connections of FIG. 1, wherein the conveyance actuating element is in a closed position, the switch actuating element in the blocking position, and the actuator in the rest position.
Figure 5:
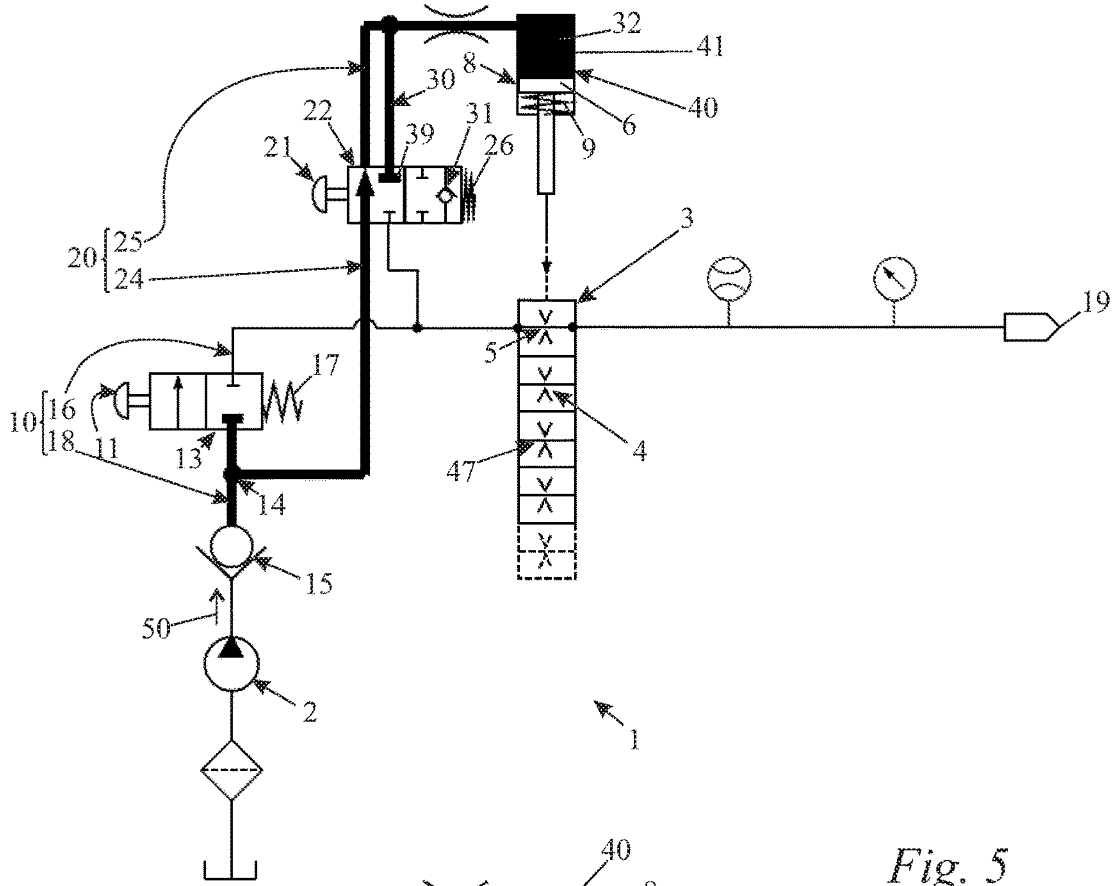
FIG. 5 is a schematic illustration of the diagram of connections of FIG. 1, wherein the conveyance actuating element is in the closed position, the switch actuating element in the passage position, and the actuator in an adjusted position.

In FIG. 4, the conveyance actuating element 11 is no longer held in the open position 12. The second restoring spring 17 has pushed the conveyance actuating element 11 into the closed position 13. The conveyance actuating element 11 is in the closed position 13. The switch actuating element 21 is still in the blocking position 23. No cleaning liquid sprays from the spray opening 19. The cleaning liquid in the pump section 18 and in the holding section 24 is under high pressure. The high-pressure cleaning device 1 is configured such that, in operation of the high-pressure cleaning device 1, a holding pressure is present in the holding section 24 of the branch line 20 in the blocking position 23 of the switch actuating element 21, while the conveyance actuating element 11 is in the closed position 13. In the state illustrated in FIG. 4, the holding pressure corresponds to the high pressure of the high-pressure cleaning device 1. The high-pressure cleaning device 1 is configured such that the holding pressure can be increased by means of the conveying pump in the blocking position 23 of the switch actuating element 21, while the conveyance actuating element 11 is in the closed position 13.

This can be required, for example, when the holding pressure has dropped due to multiple actuations of the actuator 6 by actuation of the switch actuating element 21. At the point in time illustrated in FIG. 4, the switch actuating element 21 is in its blocking position 23 and no pressure is acting on the actuator 6. The actuator 6 is in its rest position 7. The switch element 3 is still in its first switched state. The switch channel 27 of the switch element 3 illustrated in FIG. 2 leads to the first branch 33 of the conveying conduit 10 and to the first work element 4 (this situation is not illustrated in FIG. 2). The pressure of the cleaning liquid existing in the holding section 24 in regard to its absolute value is at least high enough that it can exert the force for adjusting the switch element 3 on the actuator 6. This is however done only once the switch actuating element 21 has been moved from the blocking position 23 into the passage position 22.

This is illustrated in FIG. 5. FIG. 5 shows the high-pressure cleaning device 1 with the conveyance actuating element 11 in the closed position 13 and the switch actuating element 21 in the passage position 22. The high-pressure cleaning device 1 is configured such that in operation of the high-pressure cleaning device 1, when a sufficient holding pressure is existing in the holding section 24 of the branch line 20, the cleaning liquid advances from the holding section 24 into the pressure section 25 of the branch line 20 upon switching of the switch actuating element 21 from the blocking position 23 (FIG. 4) into the passage position 25 (FIG. 5) and exerts on the actuator 6 the force for adjusting the switch element 3.

In the embodiment according to FIGS. 1 through 8, this causes a different work element 4, 5, 47 to be switched and connected to the conveying conduit 10. As illustrated in FIG. 5, a force is acting on the switch element 3 by means of the actuator 6 and this force has the effect that, instead of the first work element 4, the second work element 5 is switched and connected to the conveying conduit 10. For this purpose, the actuator 6 is moved from its rest position 7 into its adjusted position 8. This is done by means of the force of the cleaning liquid. The holding pressure of the cleaning liquid is now also acting on the actuator 6 and pushes the actuator 6 in the direction toward its adjusted position 8. In this context, the volume of the pressure chamber 32 of the hydraulic cylinder 40 is enlarged. In the embodiment according to FIGS. 1 through 8, the adjustment of the switch element 3 is realized by a rotation about the axis 48 of rotation illustrated in FIG. 2. This rotational movement can be realized, for example, by a rotational sliding guide as it is known from a ballpoint pen, for example.

The high-pressure cleaning device 1 is configured such that the switch element 3 can be moved between the first switched state and the second switched state due to a force effected by the cleaning liquid or due to a force which is effected by the user. The user can effect selectively switching of the switch element 3 by actuation of the switch actuating element 21 or by manual actuation of the switch element 3 without utilizing the pressure of the cleaning liquid.

In the state of the high-pressure cleaning device 1 illustrated in FIG. 5, no cleaning liquid sprays from the spray opening 19. In the element section 16 of the conveying conduit 10, there is no or only very little cleaning liquid at no pressure or very minimal pressure. The drainage return channel 30 is blocked by an interrupting element 39. The interrupting element 39 prevents a flow of cleaning liquid from the pressure section 25 toward the element section 16. The interrupting element 39 is a component of the switch actuating element 21. The high-pressure cleaning device 1 is configured such that in the passage position 22 of the switch actuating element 21 a fluid communication between the holding section 24 and the pressure section 25 of the branch conduit 20 can be produced and, at the same time, the drainage return channel 30 can be interrupted in regard to fluid communication such that a flow of cleaning liquid from the pressure section 25 to the element section 16 is prevented.

Figure 6:
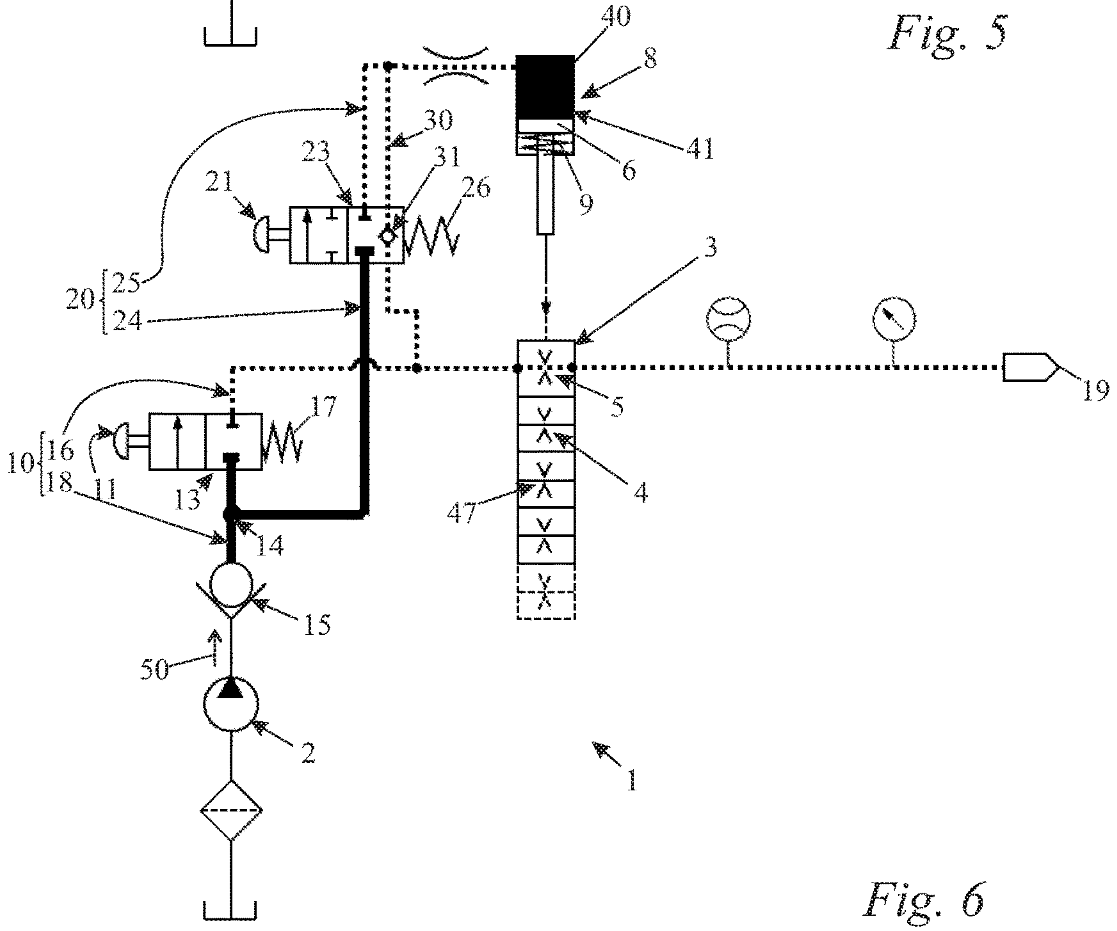
FIG. 6 is a schematic illustration of the diagram of connections of to FIG. 1, wherein the conveyance actuating element is in the closed position, the switch actuating element in the blocked position, and the actuator in the adjusted position, wherein a drainage return channel is open.
Figure 7:
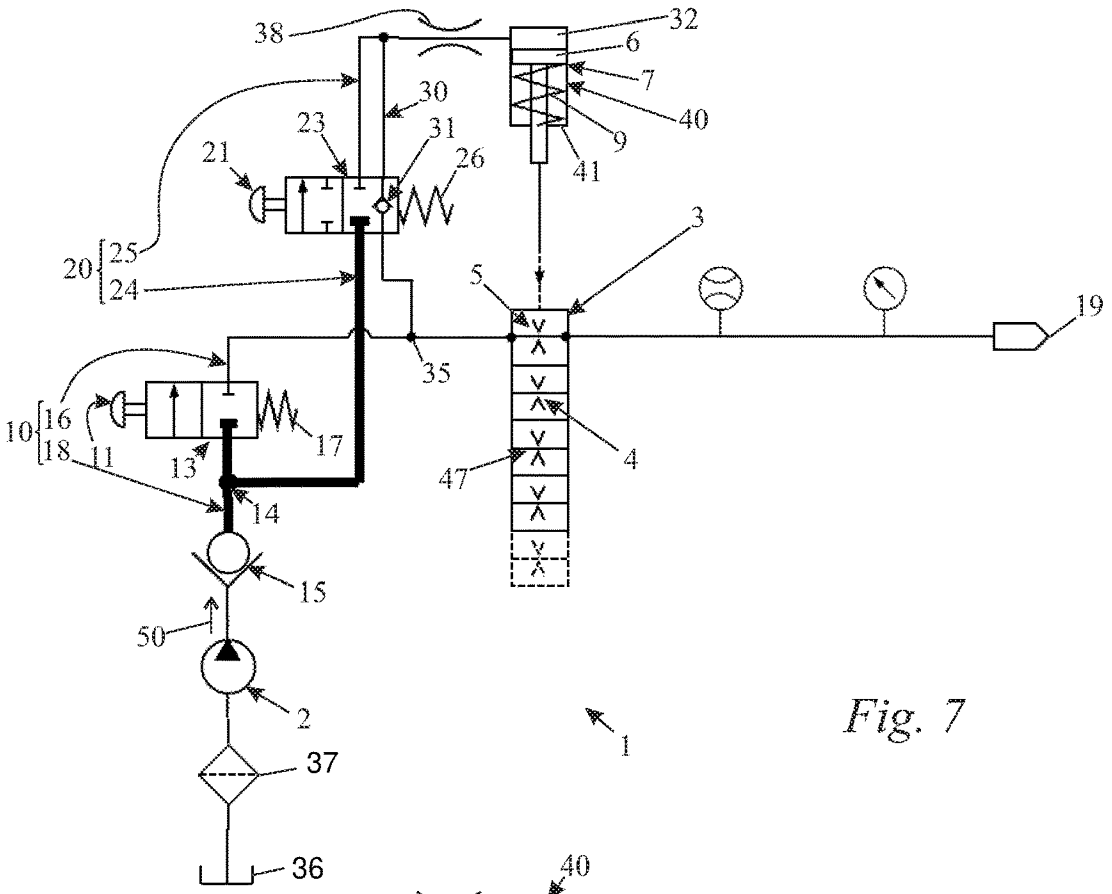
FIG. 7 is a schematic illustration of the diagram of connections of FIG. 1, wherein the conveyance actuating element is in the closed position, the switch actuating element in the blocking position, and the actuator in the rest position, wherein a drainage return channel is open.

FIGS. 6 and 7 show the high-pressure cleaning device 1 with the conveyance actuating element 11 in the closed position 13 and the switch actuating element 21 in the blocking position 23. In FIG. 6, the actuator 6 is still in its adjusted position 8; in FIG. 7, it has already been returned into its rest position 7. In order for the actuator 6 to return into its rest position 7, the holding pressure of the cleaning liquid which is present in the pressure section 25 of the branch conduit 20 must be relieved. The high-pressure cleaning device 1 is configured in such a way that, when the switch actuating element 21 is in its blocking position 23, the drainage check valve 31 is switched and connected to the drainage return channel 30 at the same time and, in this way, the pressure section 25 is connected in the direction from the pressure section 25 toward the element section 16 in fluid communication with the element section 16. From the pressure section 25, the cleaning liquid can flow through the drainage return channel 30 into the element section 16. A flow of cleaning liquid in the direction from the element section 16 to the pressure section 25 is prevented by the drainage check valve 31. This is also illustrated in FIG. 3 in which the conveyance actuating element 11 is in the open position 12 and, at the same time, the switch actuating element 21 is in the blocking position 23.

The high-pressure cleaning device 1 is configured such that the drainage return channel 30 in the passage position 22 of the switch actuating element 21 is interrupted and, in the blocking position 23 of the switch actuating element 21, a flow of cleaning liquid is enabled only in the direction from the pressure section 25 to the element section 16. The high-pressure cleaning device 1 is configured such that the drainage check valve 31 of the switch actuating element 21 in the blocking position 23 of the switch actuating element 21 is switched and connected to the drainage return channel 30. The drainage check valve 31 in the embodiment according to FIGS. 1 through 8 is a component of the switch actuating element 21. The high-pressure cleaning device 1 is configured such that the drainage check valve 31 in the passage position 22 of the switch actuating element 21, due to the adjustment of the switch actuating element 21 out of the blocking position 23 into the passage position 22, is removed from the drainage return channel 30. In the passage position 22 of the switch actuating element 21, due to the adjustment of the switch actuating element 21, the interrupting element 39 is switched and connected to the drainage return channel 30 (FIG. 5). The connection between the pressure section 25 and the element section 16 is interrupted with respect to fluid communication. When the conveyance actuating element 11 is in the closed position 13, the switch actuating element 21 is in the blocking position 23, and, at the same time, the actuator 6 is in the adjusted position 8, cleaning liquid can flow from the pressure section 25 through the drainage return channel 30 and the drainage check valve 31 to the element section 16 of the conveying conduit 10 (FIG. 6).

As indicated in FIG. 6 by the dotted line, this cleaning liquid is at low pressure. The low pressure is lower than the high pressure but higher than the minimal pressure, or hardly existing pressure, of the cleaning liquid. The cleaning liquid which is draining through the drainage return channel 30 in this way can advance to the spray opening 19 and can exit therethrough. This can be done drop by drop. In this way, the holding pressure in the pressure section 25 is relieved. At the same time, the pressure in the pressure chamber 32 of the hydraulic cylinder 40 decreases also. The pressure which is generated by the third restoring spring 9 acting on the actuator 6 is then higher than the holding pressure. The third restoring spring 9 can then force the actuator from the adjusted position 8 into the rest position 7. T his happens upon transition from FIG. 6 to FIG. 7.

In the embodiment according to FIGS. 1 through 8, the high-pressure cleaning device 1 is configured such that the switch actuating element 21 can be pushed sequentially as often as desired in order to adjust the switch element 3. The pressure of the cleaning liquid which is present in the holding section 24 is always sufficient in order to move the actuator 6 from its rest position 7 into its adjusted position 8. After a user has pushed the switch actuating element 21 from the blocking position 23 into the passage position 22 and has released the switch actuating element 21 again, the switch actuating element 21 automatically returns from the passage position 22 into the blocking position 23. This is realized due to the restoring force of the first restoring spring 26.

Figure 8:
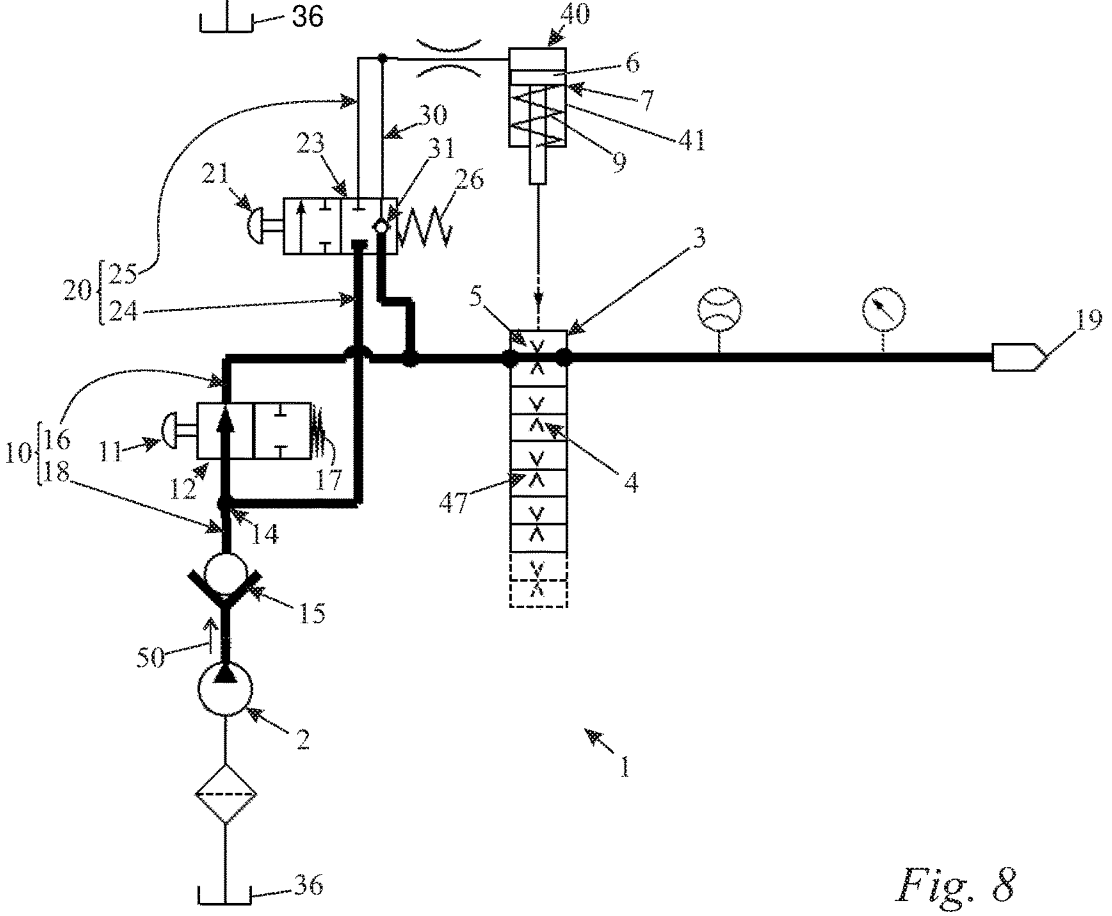
FIG. 8 is a schematic illustration of the diagram of connections of FIG. 1, wherein the conveyance actuating element is in the open position, the switch actuating element in the blocked position, and the actuator in the rest position.

FIG. 8 shows the high-pressure cleaning device 1 after the switch element 3 has been adjusted. Instead of the first work element 4, now the second work element 5 is in the conveying conduit 10. The switch actuating element 21 is in its blocking position 23, and the conveyance actuating element 11 is in its open position 12. The conveying pump 2 conveys cleaning liquid from the liquid container 36 through the conveying conduit 10 to the spray opening 19. Cleaning liquid is sprayed under high pressure out of the spray opening 19. With the exception of the difference that now the second work element 5 instead of the first work element 4 is arranged in the conveying conduit 10, the high-pressure cleaning device 1 is in the same state as in FIG. 3. When the switch actuating element 21 is actuated again, a further, different work element can be switched and connected to the conveying conduit 10. In the embodiment according to FIGS. 1 through 8, it is provided that, for a total of n working elements, the first work element 4 is switched and connected again to the conveying conduit 10 after n switching operations with the switch actuating element 21. Then the switch element 3 has carried out a complete revolution by 360° about the axis of rotation 48 illustrated in FIG. 2.

The high-pressure cleaning device 1 is configured such that the actuator 6 can adjust the switch element 3 also by a force which is exerted by the user of the high-pressure cleaning device 1 on the actuator 6.

In the embodiment according to FIGS. 1 through 8, the work elements are nozzles. However, it can also be provided that the switch element 3 switches and connects other work elements to the conveying lines 10.

For example, by means of the switch element 3 work elements can be switched into the conveying conduit 10 that enable switching of the rotational direction of a hydraulic motor. For this purpose, a work element comprises a supply line and a return line to a circuit of a hydraulic motor. The circuit is a component of the conveying conduit. The work element divides the element section into a first section between the conveyance actuating element 11 and the work element and into a second section between the work element and the spray opening 19. The circuit of the hydraulic motor comprises an inlet and an outlet. A first work element connects the first section of the element section 16 with the inlet of the circuit and connects the outlet of the circuit to the second section of the element section 16. A second work element connects the first section of the element section 16 to the outlet of the circuit and connects the inlet of the circuit to the second section of the element section 16. By switching between the first work element and the second work element, switching of the rotational direction of the hydraulic motor arranged in the circuit can be effected.

The switch element 3 can however also be used for switching on and off an additional nozzle. In this manner, for example, a corner nozzle of the surface cleaning device can be switched on or off. For this purpose, in the second section of the element section 16 two conduits would have to be provided. When switching and connecting a first work element to the conveying conduit 10, both conduits would be flushed; when switching and connecting a second work element to the conveying conduit 10, only one conduit would be flushed. This one conduit could then be the conduit for the surface cleaner, for example.

A similar configuration can also be utilized for branching off a portion of the volume flow. In this context, it can also be provided to arrange the work elements at the end of the conveying line 10 at the spray opening 19 instead of within the conveying conduit 10. Downstream of the work elements, then two conduits can be arranged, and only one or both can be flushed depending on the inserted work element. When both conduits are flushed, a portion of the volume flow can be branched off. From the branch conduit, cleaning liquid can then exit and pressure can be relieved in this way.

The switch element according to the invention can also be used for switching between two injector nozzles for admixing different cleaning agents.

The first and the second switched states can also be different gear stages of a gear. In this case, it is not different work elements that are switched and connected to the conveying conduit, but the switch element is actuated independent of the conveying conduit. The actuator can then change, for example, the position of a gear wheel. By such a mechanical engagement in a gear, in a targeted manner transmission ratios can be changed without having to accept disadvantageous losses. Such an action of the actuator on a gear can also be used for switching the rotational direction.

The specification incorporates by reference the entire disclosure of European priority document 20 185 778.6 having a filing date of Jul. 14, 2020.

While specific embodiments of the invention have been shown and described in detail to illustrate the inventive principles, it will be understood that the invention may be embodied otherwise without departing from such principles.

What is claimed is:

1. A high-pressure cleaning device comprising:

a conveying pump;

a conveying conduit comprising a spray opening, the conveying conduit configured to convey cleaning liquid, conveyed by the conveying pump, in a conveying direction from the conveying pump to the spray opening of the conveying conduit;

a switch element comprising at least a first switched state and a second switched state, wherein the switch element is rotatably supported about an axis of rotation, wherein, when switching the switch element from the first switched state into the second switched state, the switch element is rotated about the axis of rotation;

an actuator configured to adjust the switch element between the first switched state and the second switched state;

the high-pressure cleaning device configured such that the actuator is configured to adjust the switch element between the first switched state and the second switched state by an adjusting force effected by the cleaning liquid on the actuator;

at least a first work element and a second work element, wherein, by rotating the switch element about the axis of rotation, the switch element connects the first work element or the second work element to the conveying conduit;

wherein, in the first switched state of the switch element, the switch element connects the first work element to the conveying conduit and disconnects the second work element from the conveying conduit and wherein, in the second switched state of the switch element, the switch element connects the second work element to the conveying conduit and disconnects the first work element from the conveying conduit;

wherein the switch element comprises a switch channel disposed inside the switch element and passing through the switch element, wherein, in the first switched state of the switch element, the switch channel is rotated into a first position and in the first position connects the first work element to the conveying conduit and disconnects the second work element from the conveying conduit, and wherein, in the second switched state of the switch element, the switch channel is rotated into a second position and in the second position connects the second work element to the conveying conduit and disconnects the first work element from the conveying conduit.

2. The high-pressure cleaning device according to claim 1, wherein the first work element and the second work element are nozzles.

3. The high-pressure cleaning device according to claim 1, further comprising a conveyance actuating element comprising an open position and a closed position, wherein the conveyance actuating element in the open position permits the cleaning liquid to pass through the conveying conduit from the conveying pump to the spray opening, and wherein the conveyance actuating element in the closed position prevents the cleaning liquid from passing through the conveying conduit from the conveying pump to the spray opening.

4. The high-pressure cleaning device according to claim 3, further comprising a branch conduit that branches off the conveying conduit at a branch location of the conveying conduit and connects the conveying conduit to the actuator.

5. The high-pressure cleaning device according to claim 4, further comprising a switch actuating element arranged between the branch location and the actuator, wherein the switch actuating element comprises a passage position and a blocking position, wherein the switch actuating element in the passage position permits the cleaning liquid to pass through the branch conduit, and wherein the switch actuating element in the blocking position prevents the cleaning liquid from passing through the branch conduit.

6. The high-pressure cleaning device according to claim 5, wherein the switch actuating element is operatively connected to a restoring spring such that the switch actuating element is loaded by the restoring spring in a direction toward the blocking position.

7. The high-pressure cleaning device according to claim 3, wherein the conveyance actuating element is operatively connected to a restoring spring such that the conveyance actuating element is loaded by the restoring spring in a direction toward the closed position.

8. The high-pressure cleaning device according to claim 1, wherein the actuator comprises a rest position and an adjusted position, wherein the actuator for adjusting the switch element is moved from the rest position into the adjusted position and wherein the actuator is operatively connected to a restoring spring such that the actuator is loaded by the restoring spring in a direction toward the rest position.

9. The high-pressure cleaning device according to claim 1, wherein the actuator is guided in a cylinder of a hydraulic cylinder.

10. The high-pressure cleaning device according to claim 1, wherein the actuator is configured to be adjusted by a force effected by a user acting on the actuator for adjusting the switch element.

11. A high-pressure cleaning device comprising:

a conveying pump;

a conveying conduit comprising a spray opening, the conveying conduit configured to convey cleaning liquid, conveyed by the conveying pump, in a conveying direction from the conveying pump to the spray opening of the conveying conduit;

a switch element comprising at least a first switched state and a second switched state;

an actuator configured to adjust the switch element between the first switched state and the second switched state;

the high-pressure cleaning device configured such that the actuator is configured to adjust the switch element between the first switched state and the second switched state by an adjusting force effected by the cleaning liquid on the actuator;

a conveyance actuating element comprising an open position and a closed position, wherein the conveyance actuating element in the open position permits the cleaning liquid to pass through the conveying conduit from the conveying pump to the spray opening, and wherein the conveyance actuating element in the closed position prevents the cleaning liquid from passing through the conveying conduit from the conveying pump to the spray opening;

a branch conduit that branches off the conveying conduit at a branch location of the conveying conduit and connects the conveying conduit to the actuator;

a switch actuating element arranged between the branch location and the actuator, wherein the switch actuating element comprises a passage position and a blocking position, wherein the switch actuating element in the passage position permits the cleaning liquid to pass through the branch conduit, and wherein the switch actuating element in the blocking position prevents the cleaning liquid from passing through the branch conduit;

wherein the branch conduit is divided into a holding section extending from the branch location to the switch actuating element and into a pressure section extending from the switch actuating element to the actuator, wherein, in operation of the high-pressure cleaning device, a holding pressure is present in the holding section of the branch conduit when the switch actuating element is in the blocking position and the conveyance actuating element is in the closed position.

12. The high-pressure cleaning device according to claim 11, wherein the high-pressure cleaning device is configured such that the holding pressure is increased by the conveying pump when the switch actuating element is in the blocking position and the conveyance actuating element is in the closed position.

13. The high-pressure cleaning device according to claim 11, wherein the holding pressure is at least high enough to provide the adjusting force effected by the cleaning liquid on the actuator for adjusting the switch element.

14. The high-pressure cleaning device according to claim 11, wherein the branch location of the conveying conduit is arranged between the conveying pump and the conveyance actuating element.

15. The high-pressure cleaning device according to claim 11, further comprising a conveyance check valve arranged in the conveying conduit between the branch location of the conveying conduit and the conveying pump, wherein the conveyance check valve is configured to prevent a flow of the cleaning liquid in a direction opposite to the conveying direction.

16. The high-pressure cleaning device according to claim 11, wherein, in operation of the high-pressure cleaning device, when the switch actuating element is switched from the blocking position into the passage position when the holding pressure in the holding section of the branch conduit is high enough to provide the force for adjusting the switch element, the cleaning liquid advances from the holding section into the pressure section of the branch conduit and exerts the adjusting force effected by the cleaning liquid on the actuator for adjusting the switch element.

17. A high-pressure cleaning device comprising:

a conveying pump;

a conveying conduit comprising a spray opening, the conveying conduit configured to convey cleaning liquid, conveyed by the conveying pump, in a conveying direction from the conveying pump to the spray opening of the conveying conduit;

a switch element comprising at least a first switched state and a second switched state;

an actuator configured to adjust the switch element between the first switched state and the second switched state;

the high-pressure cleaning device configured such that the actuator is configured to adjust the switch element between the first switched state and the second switched state by an adjusting force effected by the cleaning liquid on the actuator;

a conveyance actuating element comprising an open position and a closed position, wherein the conveyance actuating element in the open position permits the cleaning liquid to pass through the conveying conduit from the conveying pump to the spray opening, and wherein the conveyance actuating element in the closed position prevents the cleaning liquid from passing through the conveying conduit from the conveying pump to the spray opening;

a branch conduit that branches off the conveying conduit at a branch location of the conveying conduit and connects the conveying conduit to the actuator;

a switch actuating element arranged between the branch location and the actuator, wherein the switch actuating element comprises a passage position and a blocking position, wherein the switch actuating element in the passage position permits the cleaning liquid to pass through the branch conduit, and wherein the switch actuating element in the blocking position prevents the cleaning liquid from passing through the branch conduit;

a drainage return channel connecting the pressure section of the branch conduit to an element section of the conveying conduit, wherein the element section of the conveying conduit extends from the conveyance actuating element to the spray opening, wherein the drainage return channel is interrupted in the passage position of the switch actuating element and is open in the blocking position of the switch actuating element to permit a flow of the cleaning liquid only in a direction from the pressure section to the element section.

18. The high-pressure cleaning device according to claim 17, wherein the switch actuating element comprises a drainage check valve, wherein the drainage check valve is switched and connected to the drainage return channel in the blocking position of the switch actuating element, and wherein the drainage check valve is removed from the drainage return channel in the passage position of the switch actuating element.

19. A high-pressure cleaning device comprising:

a conveying pump;

a conveying conduit comprising a spray opening, the conveying conduit configured to convey cleaning liquid, conveyed by the conveying pump, in a conveying direction from the conveying pump to the spray opening of the conveying conduit;

a switch element comprising at least a first switched state and a second switched state;

an actuator configured to adjust the switch element between the first switched state and the second switched state;

the high-pressure cleaning device configured such that the actuator is configured to adjust the switch element between the first switched state and the second switched state by an adjusting force effected by the cleaning liquid on the actuator;

at least a first work element and a second work element;

wherein, in the first switched state of the switch element, the switch element connects the first work element to the conveying conduit and disconnects the second work element from the conveying conduit and wherein, in the second switched state of the switch element, the switch element connects the second work element to the conveying conduit and disconnects the first work element from the conveying conduit;

a first housing containing the conveying pump, the conveying conduit, the switch element, and the actuator;

wherein the first work element is a first nozzle and the second work element is a second nozzle, wherein the first nozzle and the second nozzle are arranged together in a single second housing.

* * * * *